Patented Oct. 15, 1946

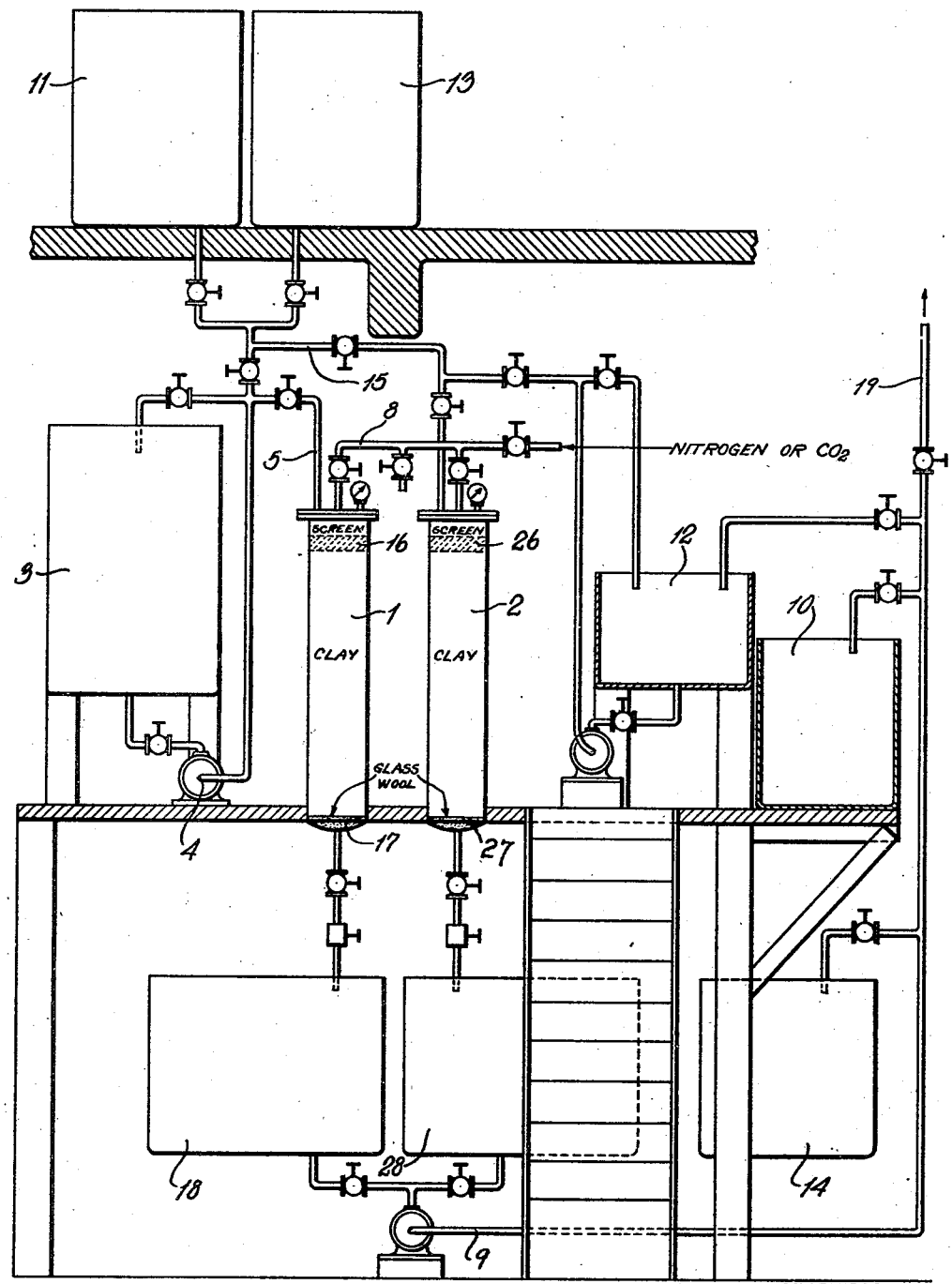

2,409,216

UNITED STATES PATENT OFFICE 2,409,216

METHOD OF REFINING RESIN

Ernest D. Lee, West Englewood, N. J., assignor to Interchemical Corporation, New York, N. Y., a corporation of Ohio Application December 27, 1943, Serial No. 515,803

4 Claims. (Cl. 260—107)

This invention relates to the purification of the crude resin obtained from resin-bearing coals such as are found in Utah, and aims to provide a method for obtaining a useful resin from this crude with a minimum of expense.

Certain coals, in particular those obtained from some mines in Utah, contain substantial percentages (up to 10%) of resinous material, which has heretofore not been utilized because of the difficulty in separating it from the coal. It has been proposed to effect such a separation by froth flotation (U. S. Patent No. 1,773,997), but the product obtained is a very dirty material, being contaminated with a considerable percentage (15 to 20%) of coal. Attempts to separate the coal by dissolving the resin away from it have not proven successful, because the solutions tend to clog the filters badly. Attempts have likewise been made to dissolve the resin directly out of coal with solvents, but such methods are far too costly, because of the fact that large quantities of solvent are retained by the coal, so that the cost of recovery is excessive.

I have discovered that resin of good grade can be obtained from resin-bearing coals simply and economically, by first separating the resin from the bulk of the coal by an aqueous flotation, to obtain a product which is largely resin. This product is then heated at an elevated temperature (of the order of 250 to 300° C.) for from 3 hours to 30 minutes. After this heat-treatment, the resin is dissolved in a hydrocarbon solvent such as petroleum naphtha, toluene, etc.; the heat-treatment produces a resin which yields filterable solutions, whereas the resin per se produces solutions which are not filterable. The coal is then separated from the resin solution. This solution may then be evaporated to produce a rather dark resin, which is acceptable for making dark colored coatings or inks, or for use wherever a hydrocarbon-soluble resin may be desired. Preferably, the solution is passed through fuller's earth, or an activated heat-treated clay, to remove color bodies, and the lighter colored resins remaining in solution are recovered.

My tests indicate that the coal resin is not extensively altered by the heat-treatment, but that only a very few percent (less than 5) of the resin is solubilized. I believe that this portion of the resin swells in the solvent before heat-treatment, rather than dissolving, thus producing solutions which plug up the filters; the heat-treatment increases the solubility of this small percentage of resin.

Using the Fisher Johns method (Eimer & Amend Catalog 90—p. 619) the concentrate containing the coal has a melting point of the order of 185° C., which is probably very close, in view of the method involved, to the melting point of the complete resin. The heat-treated resin, after recovery, has a melting point of about 178° C.

The resin solution may be made in any of the common hydrocarbon solvents, or ketones or esters may be used. Because of their low cost, petroleum naphthas are preferred. Any concentration of resin which does not produce too viscous a solution to be handled may be employed. I find that for economy reasons, the resin concentration should preferably not be less than 15%; solutions above about 40% concentration are somewhat difficult to handle insofar as a discoloration process is involved, although somewhat more concentrated solutions may be used if the purification is limited to the separation of coal.

The decolorization may be carried out in the apparatus illustrated in the drawing attached. In that drawing, 1 and 2 are towers, packed with fuller's earth, or a heat-treated decolorizing clay. The solution of dark resin is in the tank 3—it is pumped by a pump 4 through pipe 5 into tower 1, which is provided with a screen 16 at the top, and a glass wool bat 17 at the bottom thereof. The atmosphere in the tower is maintained inert by the introduction of nitrogen or $CO_2$ through the pipe 8. The decolorized solution passes into a container 18, and filtration is continued until the solution in the tank 18 reaches the desired shade. The valves are then changed to pass the original solution into the pipe 15, and thence into tower 2, a duplicate of tower 1, provided with a screen 26 and a glass wool bat 27. The process is repeated.

While decolorization proceeds in tower 2, the solution in tank 18 is pumped through pipe 9 to a storage tank 10. When this is complete, action is stopped until tower 2 has delivered its light-colored resin solution, and the solution in tank 28 is then pumped into the storage tank 10.

Naptha from tank 11 then passes through towers 1 and 2, dissolving out a darker colored resin. This is pumped into a separate storage tank 12.

Finally, a mixture of alcohol and naphtha (50–50) from tank 13 is used to flush out the system and remove the color bodies from the clay. This solution is pumped into tank 14, and contains a black resin. The final dilute wash liquid bypasses all the storage tanks, and goes up pipe 19 to a recovery still. As soon as this liquid is clean, the towers are ready for reuse.

It is sometimes desirable to distill the residual alcohol-naphtha mixture from the clay in the towers; this can be done by applying heat, and hooking pipe 8 to a condenser.

By hooking several pairs of towers to a single set of tanks, continuous operation can be ensured.

Obviously, the described decolorization process can be modified, or omitted entirely. The resin solutions obtained can be used as such, or the resin recovered by removing the solvent, by distillation or the like. The light-colored resin can be used generally; the darker and black resins may be used for black coatings and inks, or for plastics.

The solubilization of the resin by heat treatment begins to take place in the molten resin just above the melting point (185° C.), but proceeds very slowly at temperatures substantially below 250° C. Above about 300° C. apparent depolymerization of the resin sets in, and such high temperatures should be avoided.

My method provides for the first time economical recovery of a useable grade of resin from coal resin concentrates.

I claim:

1. In the method of recovering the resin from a resin-bearing coal of the Utah type wherein the resin is separated from the bulk of the coal to produce a resin concentrate consisting of resin admixed with coal, the steps which comprise heating the resin concentrate to a temperature above about 185° C. but below the point at which substantial depolymerization of the resin takes place to render the resin content thereof freely soluble in hydrocarbon solvents and to produce freely filterable hydrocarbon solutions of the resin, dissolving the resin content of the heat-treated resin concentrate in a hydrocarbon solvent, and separating the insoluble coal from the resulting resin solution by filtration.

2. In the method of recovering a light-colored resin from a resin-bearing coal of the Utah type wherein the resin is separated from the bulk of the coal to produce a resin concentrate consisting of resin admixed with coal, the steps which comprise heating the resin concentrate to a temperature above about 185° C. but below the point at which substantial depolymerization of the resin takes place to render the resin content thereof freely soluble in hydrocarbon solvents and to produce freely filterable hydrocarbon solutions of the resin, dissolving the resin content of the heat-treated resin concentrate in a hydrocarbon solvent, separating the insoluble coal from the resulting resin solution by filtration, and treating the coal-free resin solution with a decolorizing agent.

3. In the method of recovering the resin from a resin-bearing coal of the Utah type wherein the resin is separated from the bulk of the coal to produce a resin concentrate consisting of resin admixed with coal, the steps which comprise heating the resin concentrate to a temperature on the order of 250 to 300° C. to render the resin content thereof freely soluble in hydrocarbon solvents and to produce freely filterable hydrocarbon solutions of the resin, dissolving the resin content of the heat-treated resin concentrate in a hydrocarbon solvent, and separating the insoluble coal from the resulting resin solution by filtration.

4. In the method of recovering the resin from a resin-bearing coal of the Utah type wherein the resin is separated from the bulk of the coal to produce a resin concentrate consisting of resin admixed with coal, the steps which comprise heating the resin concentrate to a temperature on the order of 250 to 300° C. for ½ to 3 hours to render the resin content thereof freely soluble in hydrocarbon solvents and to produce freely filterable hydrocarbon solutions of the resin, dissolving the resin content of the heat-treated resin concentrate in a hydrocarbon solvent, and separating the insoluble coal from the resulting resin solution by filtration.

ERNEST D. LEE.